(12) United States Patent
Ishihara et al.

(10) Patent No.: US 7,746,492 B2
(45) Date of Patent: Jun. 29, 2010

(54) IMAGE DATA TRANSMITTER AND IMAGE DATA COMMUNICATION SYSTEM

(75) Inventors: Yasuhiro Ishihara, Toyokawa (JP); Shigeo Ogino, Hino (JP); Munehiro Natsume, Toyokawa (JP); Natsuyo Higashi, Hoi-gun (JP); Masazumi Ito, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1589 days.

(21) Appl. No.: 10/976,929

(22) Filed: Nov. 1, 2004

(65) Prior Publication Data
US 2006/0037061 A1    Feb. 16, 2006

(30) Foreign Application Priority Data
Aug. 16, 2004    (JP)    .............................. 2004-236428

(51) Int. Cl.
G06F 3/12    (2006.01)
(52) U.S. Cl. .................... 358/1.15; 358/540; 358/1.13; 358/426.12; 709/201; 379/88.13
(58) Field of Classification Search ................ 358/1.9, 358/1.15, 402, 426.12, 407, 1.13, 403, 540; 379/88.11, 88.13, 100.09; 709/201, 207, 709/245; 704/275
See application file for complete search history.

(56) References Cited

U.S. PATENT DOCUMENTS

| | | | | |
|---|---|---|---|---|
| 5,832,100 A | * | 11/1998 | Lawton et al. ............... | 382/100 |
| 6,801,340 B1 | * | 10/2004 | Endo ......................... | 358/403 |
| 7,386,594 B2 | * | 6/2008 | Foulger et al. .............. | 709/206 |
| 7,502,129 B2 | * | 3/2009 | Tohyama .................... | 358/1.13 |
| 7,652,781 B2 | * | 1/2010 | Fukui et al. ................. | 358/1.15 |
| 2004/0207872 A1 | * | 10/2004 | Takahashi et al. .......... | 358/1.15 |
| 2005/0070783 A1 | * | 3/2005 | Yanagita ..................... | 600/407 |

FOREIGN PATENT DOCUMENTS

| | | | |
|---|---|---|---|
| JP | 06-291779 | * | 10/1994 |
| JP | 8-23396 | | 1/1996 |
| JP | 2003-208390 | | 7/2003 |

OTHER PUBLICATIONS

Japanese Office Action dated Feb. 14, 2006 and translation thereof.

* cited by examiner

*Primary Examiner*—Twyler L Haskins
*Assistant Examiner*—Dennis Dicker
(74) *Attorney, Agent, or Firm*—Buchanan Ingersoll & Rooney PC

(57) ABSTRACT

Provided is an image data transmitter in which, in the event of transmission of the same image data to multiple recipients, the image data with added supplementary information different for each of the multiple recipients can be transmitted through easy operation. Further provided is an image data communication system using the image data transmitter. An image of a document is read out, and a destination of the image is set. Multiple destinations can be set. Then, selection is performed whether or not to input supplementary information. When performing input processing, a destination to which the supplementary information is to be transmitted is selected from the multiple destinations. Subsequently, the supplementary information for the destination is input, and the supplementary information is correlated with the destination. Additionally, the image data and the supplementary information are combined. Then, composite data for the destination is transmitted to the destination.

20 Claims, 15 Drawing Sheets

IMAGE DATA TRANSMITTER AND IMAGE DATA COMMUNICATION SYSTEM

This application is based on Application No. 2004-236428 filed in Japan on Aug. 16, 2004, contents of which is hereby incorporated by reference.

BACKGROUND OF THE INVENTION

1. Field of the Invention

The present invention relates to an image data transmitter that acquires image data and transmits the image data to another device. More specifically, the invention relates to an image data transmitter capable of adding supplementary information to image data and transmitting the total data. Further, the invention relates to an image data communication system configured of the image data transmitter and image data receivers at receiving ends.

2. Description of Related Art

Conventionally, a scanner is used to read a document and to acquire image data. A scanner can be used by being connected to a network with other devices, such as a personal computer and a printer. In this case, image data acquired by the scanner can be transmitted to other devices connected to the network. In regard to such usage, Japanese Unexamined Patent Application. Publication No. 08-23396 discloses techniques that correlate voice data with image data and transmit the both data. The publication describes that the techniques enable such processing as adding supplementary descriptive text to a transmission document data and transmitting an accompanying drawing relevant to telephone communications to easily be performed.

However, in such a network connection environment as described above, there are cases where scanner-read image data is desired to be transmitted to a plurality of recipients. Further, there are cases where supplementary information to be accompanied with the image data is different for individual recipients. When such case is handled with a device according to the techniques disclosed in the above-mentioned publication, data input processing has to be done for each recipient or for each group of recipients to which different supplementary information is transmitted. As such, since the same document has to be repeatedly read, the operation is intricate. Otherwise, such supplementary descriptive text and the like are only provided with respect to the entirety of image data, so that when, for example, image data is large in volume, supplementary descriptive text and the like do not effectively function.

SUMMARY OF THE INVENTION

The present invention is made to solve problems occurring with conventional techniques such as those described above. More specifically, the present invention is to provide an image data transmitter wherein, in the event of transmission of the same image data to multiple recipients, the image data with added supplementary information different for each of the multiple recipients can be transmitted through easy operation, and an image data communication system using the image data transmitter. In addition, the invention is to provide an image data transmitter wherein, in the event of transmission of image data with supplementary information, a location in the image data where the supplementary information is added can be specified.

According to a first aspect of the present invention, there is provided an image data transmitter comprising: an image data acquiring section that acquires image data; an image data transmitter section that transmits image data to destinations; a destination setting section that sets at least two destinations; a destination selector section that selects at least one of destinations which is set by the destination setting section; a supplementary information acquiring section that acquires supplementary information which is to be added to image data; a destination versus supplementary information correlator section that establishes a correlation between destination selected by the destination selector section and supplementary information acquired by the supplementary information acquiring section; and a data combiner section that creates composite data for destination selected by the destination selector section, the composite data being created by adding supplementary information correlated to the destination by the destination versus supplementary information correlator section to image data acquired by the image data acquiring section, wherein to destination selected by the destination selector section, the image data transmitter section transmits composite data created by the data combiner section for the destination.

In the image data transmitter, two or more destinations can be set by the destination setting section. In addition, of destinations having been set, a destination(s) correlated with the supplementary information can be selected by the destination selector section. After the supplementary information acquiring section has acquired supplementary information that is to be added to the image data, the data combiner section creates composite data. The composite data is composite of the image data acquired by the image data acquiring section and the supplementary information acquired by the supplementary information acquiring section. Then, the image data transmitter section transmits the composite data to the destination(s) selected by the destination selector section. The composite data is created by the data combiner section in a manner that the supplementary information correlated with the destination is added to the image data. As such, in the manner that the supplementary information different for each destination is selected, composite data with added supplementary information unique to the each destination can be transmitted. In this case, the image data need not be acquired for each destination.

According to a second aspect of the present invention, there is provided an image data transmitter comprising: an image data acquiring section that acquires image data; an image data transmitter section that transmits image data to a destination; a destination setting section that sets a destination; a supplementary information acquiring section that acquires supplementary information which is to be added to image data; a page information storage section that stores page information of image data acquired by the image data acquiring section; a page selector section that selects at least one of pages contained in page information stored in the page information storage section; a page versus supplementary information correlator section that establishes a correlation between page selected by the page selector section and supplementary information acquired by the supplementary information acquiring section; and a data combiner section that creates composite data created by adding supplementary information acquired by the supplementary information acquiring section to image data acquired by the image data acquiring section, wherein: the data combiner section adds supplementary information correlated with page by the page versus supplementary information correlator section to the page in the image data; and the image data transmitter section transmits composite data created by the data combiner section to destination set by the destination setting section.

The data combiner section in the image data transmitter adds supplementary information correlated with page by the page versus supplementary information correlator section to the page in the image data. Therefore, the page where the supplementary information added can be specified.

The image data communication system of the present invention is configured to include any one of the above-described image data transmitters and (an) image data receiver(s). The image data receiver comprises an image data processor section that processes received image data; and a supplementary information processor section that processes supplementary information when received data is composite data.

According to the present invention, an image data transmitter is provided in which, in the event of transmission of the same image data to multiple recipients, the image data with added supplementary information different for each of the multiple recipients can be transmitted through easy operation, and an image data communication system using the image data transmitter. Otherwise, an image data transmitter is provided in which, when transmitting image data with added supplementary information, a location in the image data to which the supplementary information is added can be specified.

BRIEF DESCRIPTION OF THE DRAWINGS

For better understanding of the present invention, reference is made to the following detailed description of the invention, just in conjunction with the accompanying drawings in which.

DETAILED DESCRIPTION OF PREFERRED EMBODIMENTS

Figure 1:
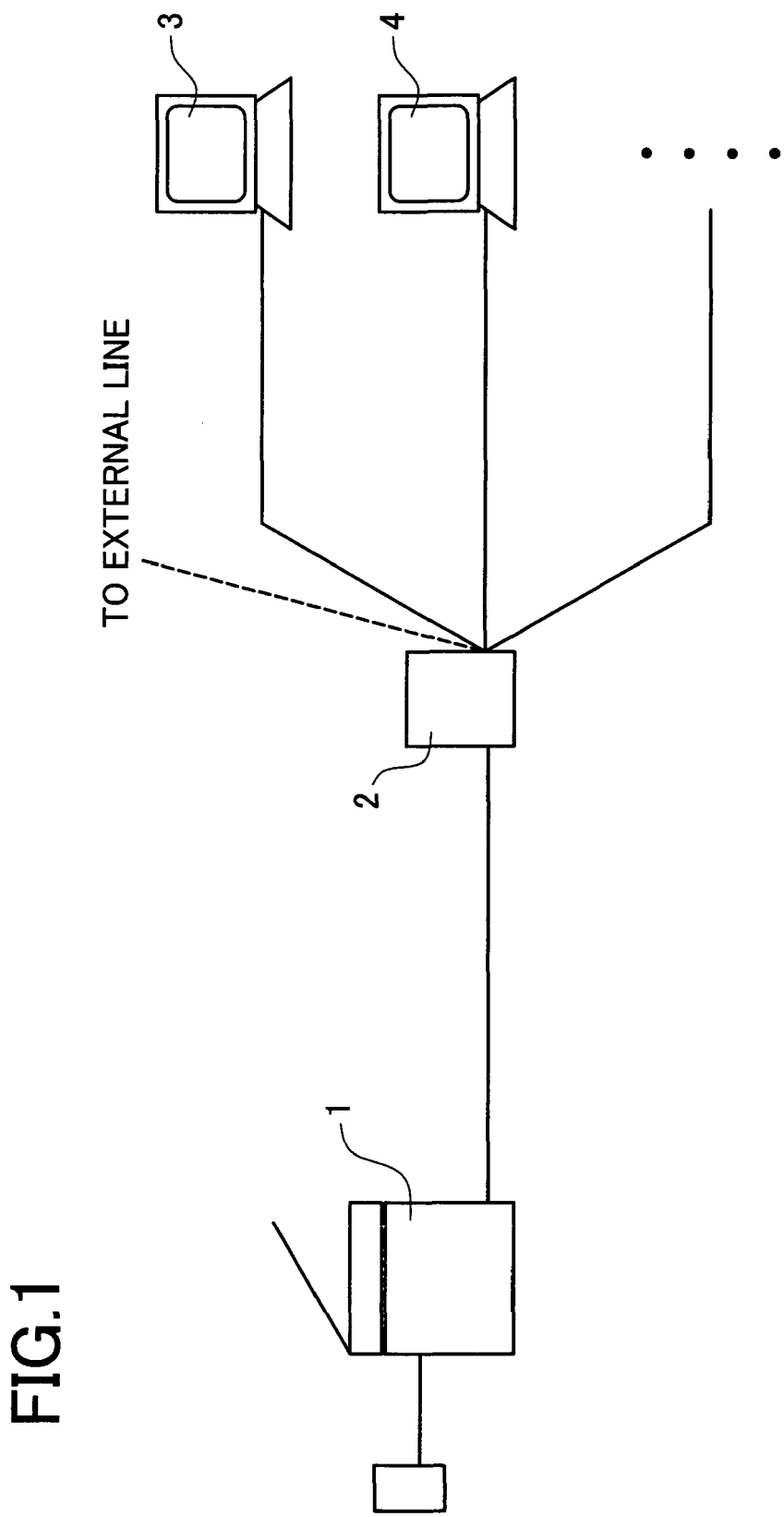
FIG. 1 is a schematic view showing the configuration of an embodiment of an image data communication system, which is an application object of the present invention.

A best embodiment formed by particularizing the present invention will be described in detail herein with reference to the accompanying drawings. The present embodiment is an image data communication system shown in a schematic view of FIG. 1 to which the present invention is adapted. The image data communication system shown in FIG. 1 is configured such that a scanner 1 and data receivers 3, 4, . . . are connected through a server 2. In addition, the server 2 is connected to an external line. A unique address is allocated to the each individual data receiver 3, 4. A personal computer is used as the each individual data receiver 3, 4. Although only the single scanner 1 and the two data receivers 3 and 4 are shown in FIG. 1, practically many other devices may be connected. For example, printers and facsimile machines may be connected.

Figure 2:
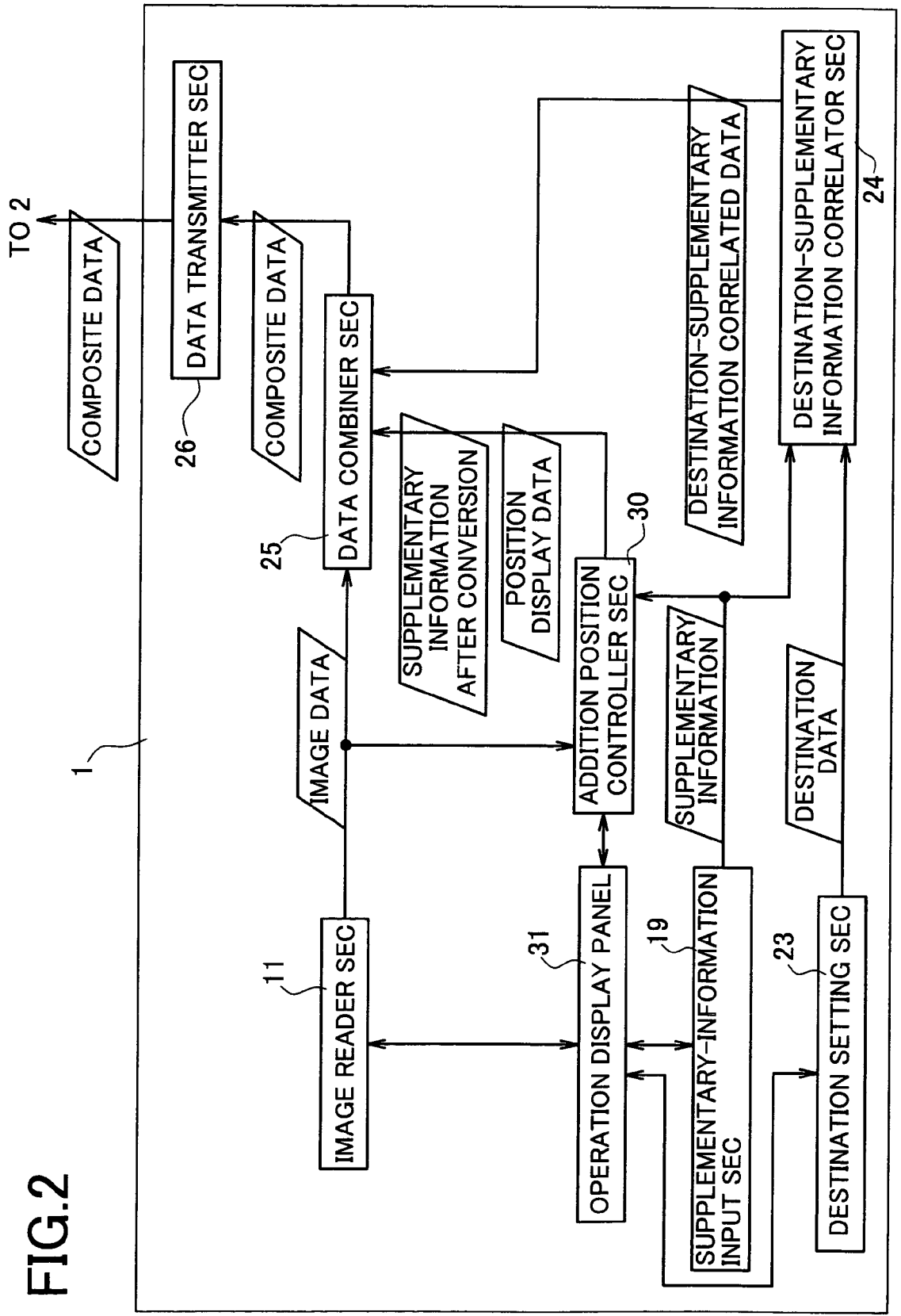
FIG. 2 is a block diagram showing the configuration of a scanner according to the embodiment.

The scanner 1 in the image data communication system shown in FIG. 1 is configured as shown in the block diagram of FIG. 2. Specifically, provided in the scanner 1 are an image reader section 11, a supplementary-information input section 19, a destination setting section 23, a destination versus supplementary information correlator section 24, a data combiner section 25, a data transmitter section 26, an addition position controller section 30, and an operation display panel 31.

The image reader section 11 is of an ordinary type that reads an image of a document and that outputs image data. The supplementary-information input section 19 allows a user to input supplementary information that is to be added to the image data whereby to be transmitted with the image data. As supplementary information, there are voice information, image data (representing, for example, icon and motion images different from images that are read out by the image reader section 11), and character information (such as linkage destination information). In the present description, it is assumed that the user inputs voice information by using a mobile terminal of the user's own. The voice information can be input also from a microphone or the like if provided to the scanner 1. A destination setting section 23 sets that read out image data is to be transmitted to which one of the data receivers 3, 4. Practically, the user conducts input processing from the operation display panel 31.

Figure 3:
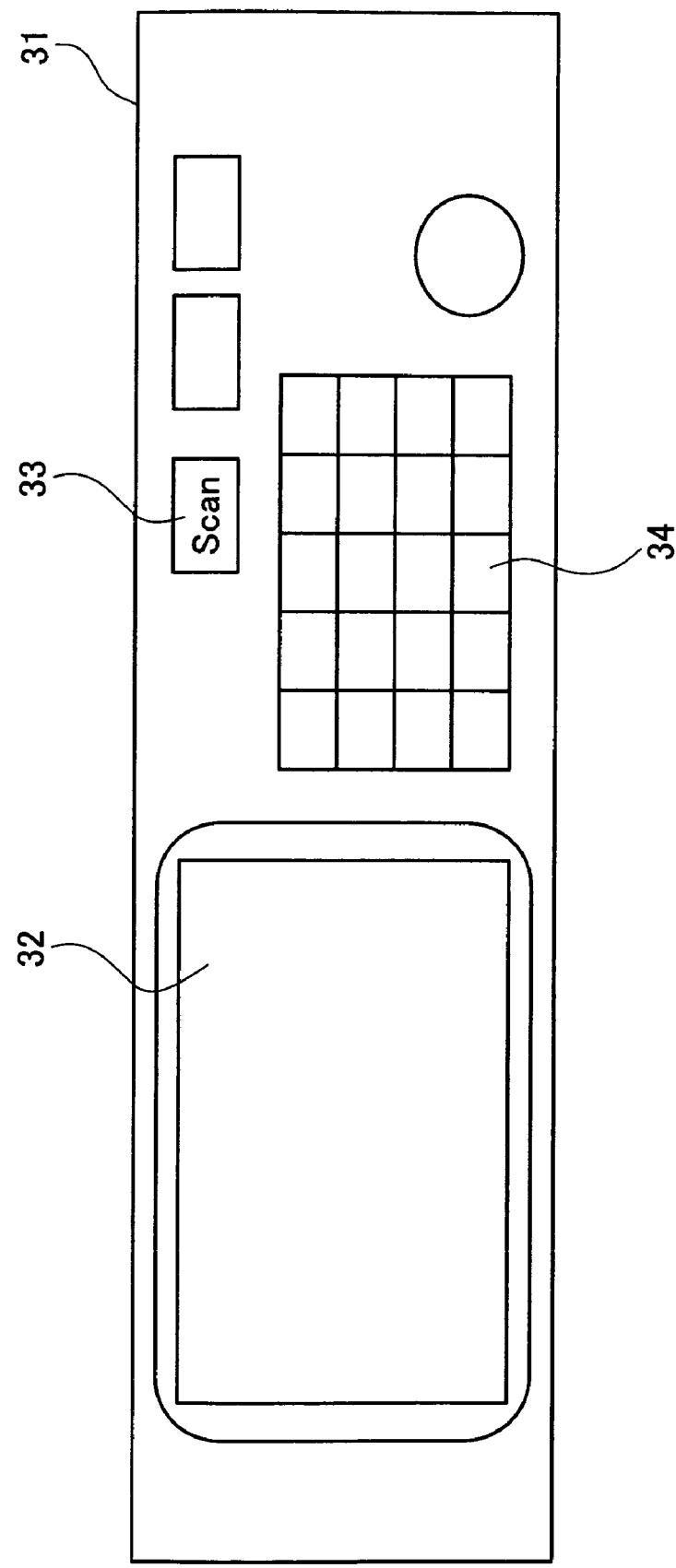
FIG. 3 is a plan view showing an operation display panel of the scanner according to the embodiment.

The destination versus supplementary information correlator section 24 establishes the correlation between the supplementary information, which has been input in the supplementary-information input section 19, and the destination information, which has been set by the destination setting section 23. The correlator section 24 establishes the correlation in which specified supplementary information is transmitted to a specified destination(s). More practically, the user conducts input processing from the operation display panel 31. The data combiner section 25 creates composite data of image data, which has been read out from a document in the image reader section 11, and supplementary information, which has been input in the supplementary-information input section 19. The data transmitter section 26 transmits the composite data created in the data combiner section 25 to the server 2. The addition position controller section 30 performs control specifying a position of the image data at which the supplementary information is to be added. More specifically, the addition position controller section 30 accepts an input of an addition position from the operation display panel 31, and converts the supplementary information in accordance with the addition position having been input. As is shown in FIG. 3, the operation display panel 31 has a screen 32, a scan key 33, and input keys 34. The screen 32 has a touchpanel function.

Figure 4:
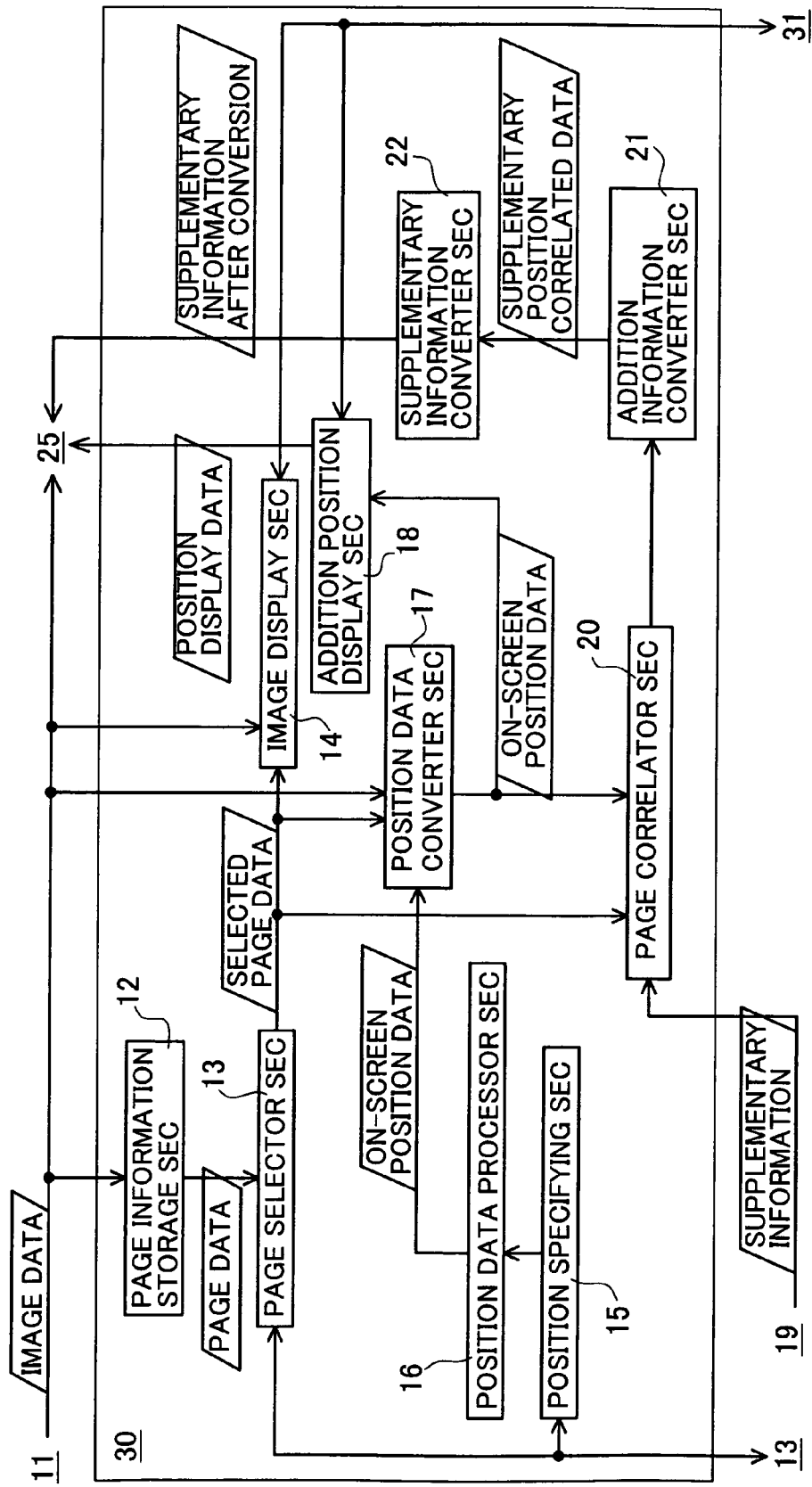
FIG. 4 is a block diagram showing the configuration of an addition position controller section of the scanner according to the embodiment.

Further, the addition position controller section 30, which is shown in FIG. 2, has a configuration shown in the block diagram of FIG. 4. In the addition position controller section 30 shown in FIG. 4, there are provided (each in the form of a functional block) a page information storage section 12, a page selector section 13, an image display section 14, a position specifying section 15, a position data processor section 16, a position data converter section 17, an addition position display section 18, a page correlator section 20, an addition position correlator section 21, and a supplementary information converter section 22.

The page information storage section 12 stores page data indicative of the page configuration of image data having been read out by the image reader section 11. In accordance with page data, the page selector section 13 selects a page to which supplementary information is added. In accordance with selected page data from the page selector section 13, the image display section 14 displays an image of a currently selected page on the screen 32 of the operation display panel 31. The position specifying section 15 controls user specification of a position on the screen 32. The position data processor section 16 outputs on-screen position data in accordance with a position specified in the position specifying section 15.

The position data converter section 17 outputs in-image position data in accordance with the selected page data from the page selector section 13 and the on-screen position data from the position data processor section 16. The addition position display section 18 displays the position specified in the position specifying section 15 on the screen 32. The page correlator section 20 establishes the correlation between the page selected in the page selector section 13 and the supplementary information. The addition position correlator section 21 performs correlation between the position specified in the position specifying section 15 and the supplementary information. The supplementary information converter section 22 converts the format of the supplementary information into a format that can be added to the image data.

Figure 5:
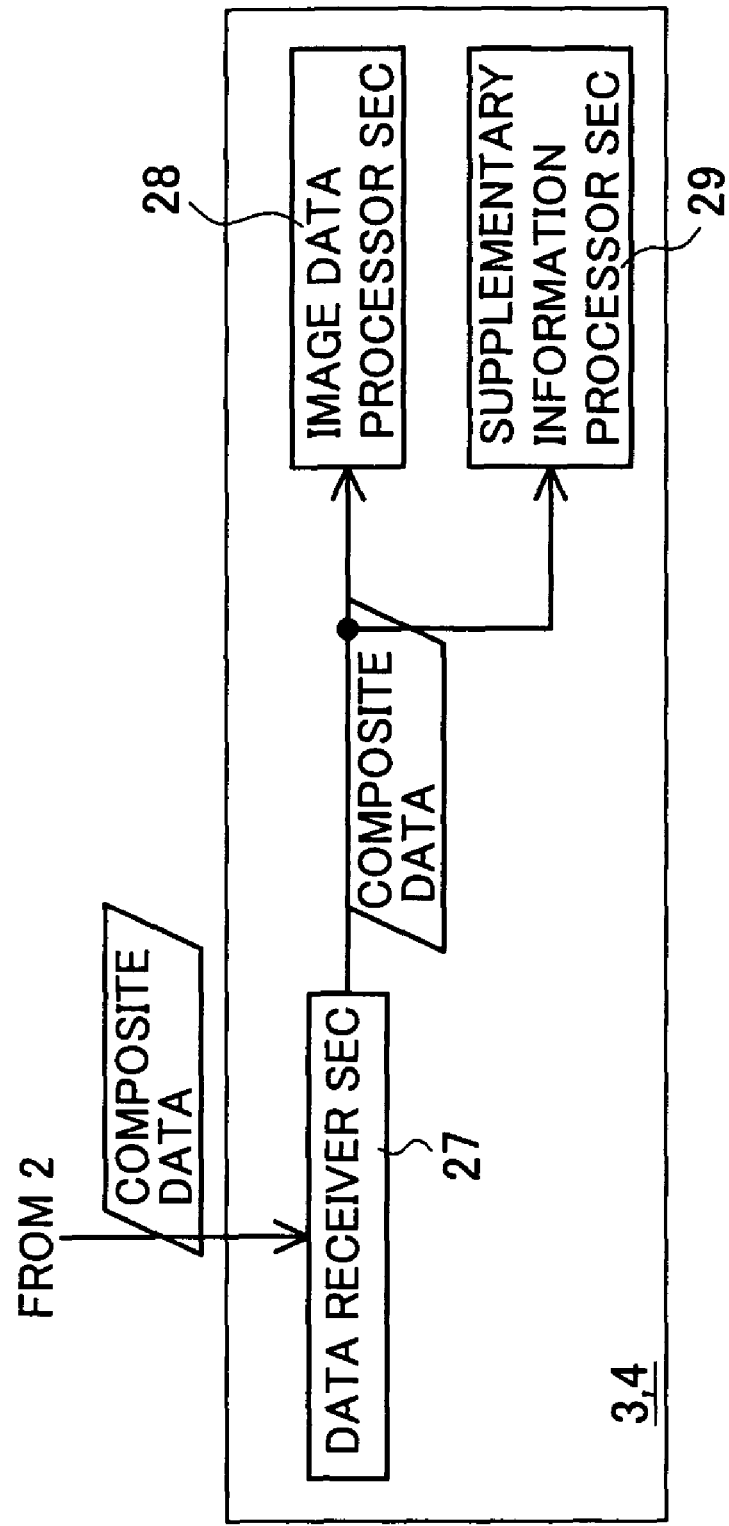
FIG. 5 is a block diagram showing the configuration of a data receiver according to the embodiment.

As is shown in the block diagram of FIG. 5, the data receiver 3, 4 of the image data communication system, which is shown in FIG. 1, has a data receiver section 27, an image data processor section 28, and an supplementary information processor section 29. In this configuration, composite data is received by the data receiver section 27 through the server 2, and is distributed to the image data processor section 28 and the supplementary information processor section 29. Then, the image data in the composite data is extracted and processed in the image data processor section 28. Similarly, the supplementary information in the composite data is extracted and processed in the supplementary information processor section 29. The arrangement may of course be such that the composite data is first decomposed into the image data and the supplementary information, then only necessary items of the information be distributed to the image data processor section 28 and the supplementary information processor section 29.

Figure 6:
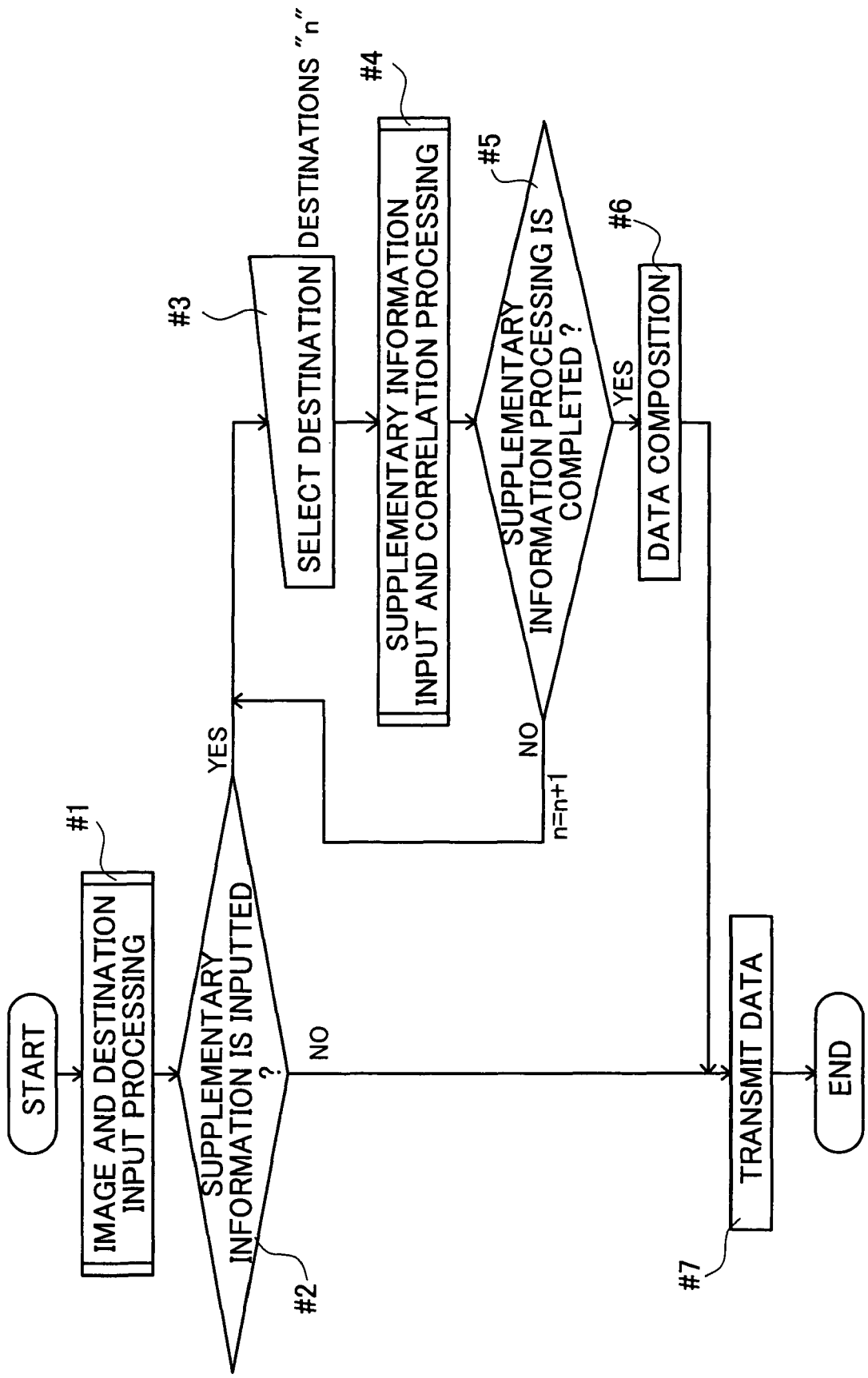
FIG. 6 is a flow diagram showing an overall operation of the image data communication system according to the embodiment.

Then, the overall operation of the scanner 1 in the image data communication system of the embodiment will be briefly described hereunder by reference to the flow diagram of FIG. 6. In the scanner 1 according to the embodiment, the image reader section 11 reads out an image of a document, and the destination setting section 23 sets a destination of the image (at step #1 (shown only with the step number hereafter)). Then, the supplementary-information input section 19 selects whether or not to input supplementary information through the supplementary-information input section 19 (#2). If no supplementary information is input (#2:No), the image data is transmitted as it is to a destination (#7). Thus, to a destination with which no supplementary information is correlated, image data without added supplementary information is transmitted by the data transmitter section 26.

If supplementary information is input (#2:Yes), a destination to which the supplementary information is to be transmitted is selected from destinations set by the destination setting section 23 (#3). Subsequently, the operation performs, for example, input processing for the supplementary information through the supplementary information input section 19 and various correlating processings regarding the supplementary information (#4). The correlating processings include, for example, correlating processings for performing correlation between the destination and the supplementary information, between the page in the image data and the supplementary information, and between the position in the page and the supplementary information. Then, the operation determines whether the processings regarding the supplementary information has been completed (#5). If not yet completed (#5:No), the operation returns to #3; whereas, if completed (#5:Yes), the operation proceeds to #6. Then, data composition is executed (#6). Of course, in subsequent data transmission (#7) in this case, composite data is transmitted to the destination correlated with the supplementary information. Thus performed is the overall operation of the image data communication system of the embodiment.

Operation of the scanner 1 will be described in detail below with reference to not only FIG. 6, but also FIGS. 7 to 21.

Firstly, step #1, "image and transmitted input processing", in the flow diagram of FIG. 6 will be described hereunder with reference to the flow diagram of FIG. 7. At the outset, in the image and transmitted input processing, destination setting is executed (#11). In the event of the destination setting, the screen 32 of the operation display panel 31 displays a screen as shown in FIG. 8 under control of the destination setting section 23. In this state, the user inputs a destination address by using the input keys 34. Alternatively, the address can be selected from pre-registered addresses. In this case, registered addresses are called by touching a display portion "Address book 1" or "Address book 2" whereby to select an address. In this case, not only one address, but also a plurality of addresses may be input or selected. The addresses thus input or selected are recognized as destination data indicative of a destination to which data is to be transmitted in the present instance.

Subsequently, image scan is executed (#12). Specifically, the user places a desired readout document on a document placing portion, and then depresses the scan key 33 of the operation display panel 31, whereby the scan is executed. Then, an output of readout undergoes image data processing, and image data is thereby created (#13) Subsequently, page data indicative of the page configuration of the image data is stored into the page information storage section 12 (#14). In this manner, the image and transmitted input processing is performed. The destination setting of #11 and image-data related processings of #12 to #14 may be interchanged in the sequence of execution.

Figure 7:
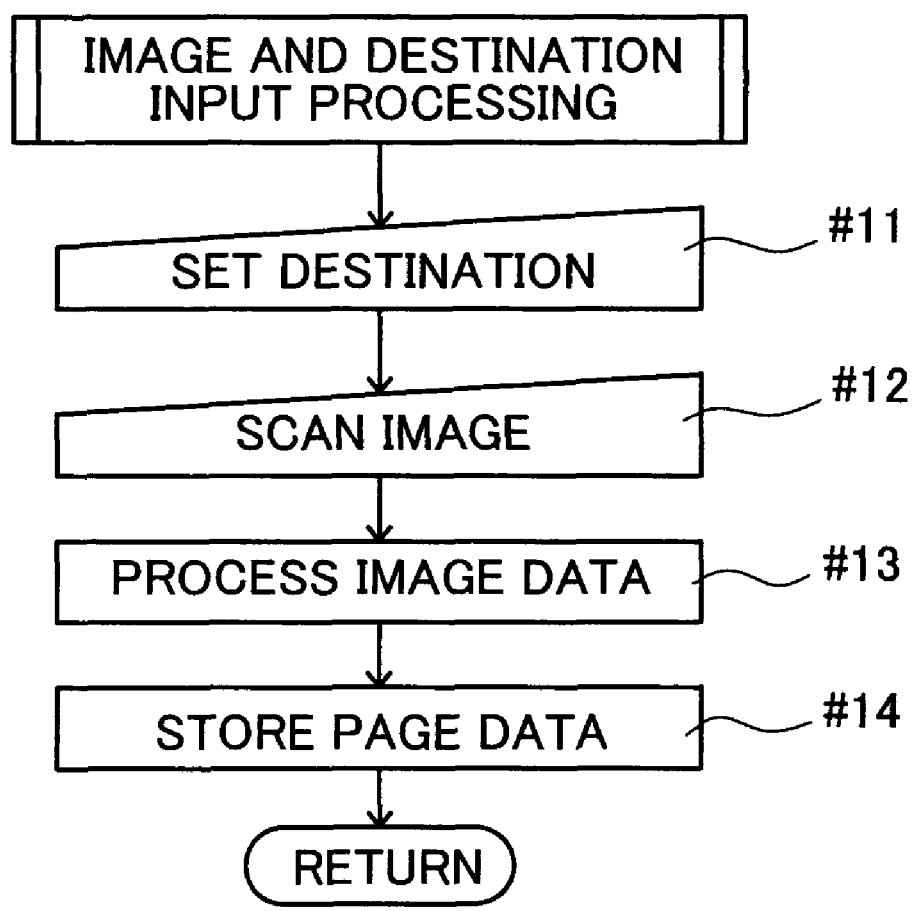
FIG. 7 is a flow diagram showing image and destination input processing in detail.
Figure 8:
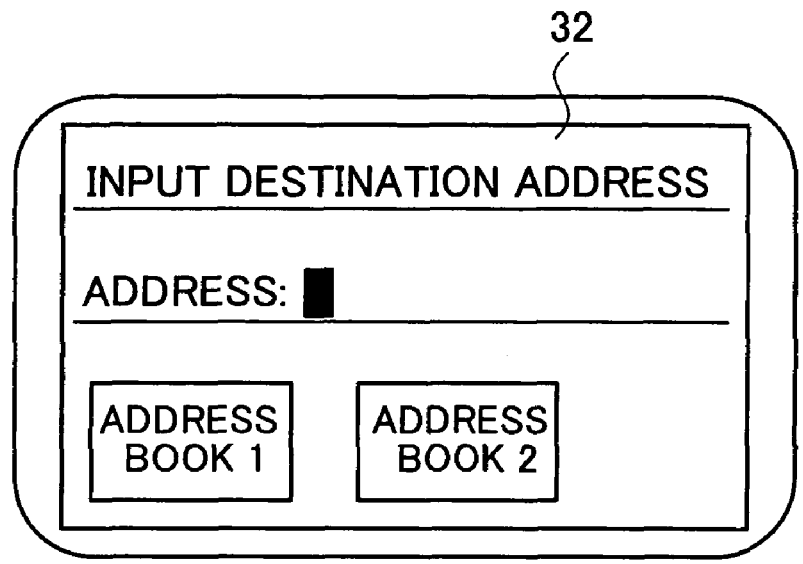
FIG. 8 is a plan view showing a screen on the operation display panel for destination setting.
Figure 9:
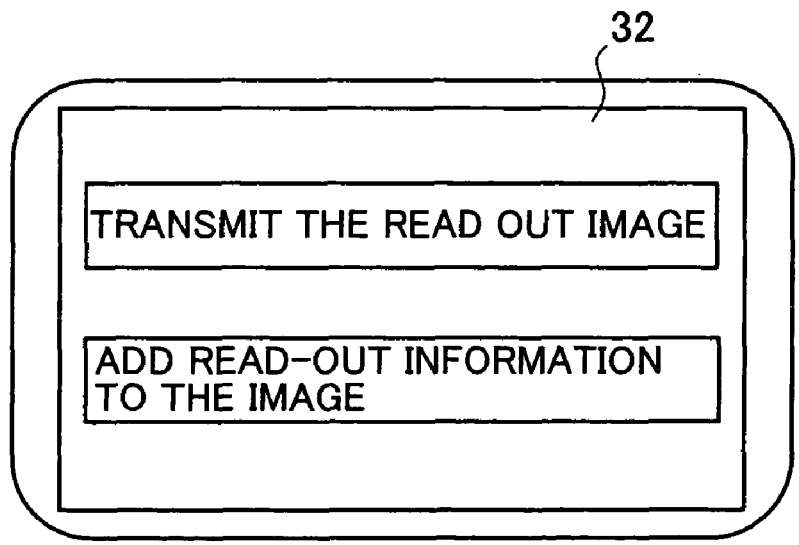
FIG. 9 is a plan view showing a screen on the operation display panel for selecting presence or absence of an input of supplementary information.

Upon termination the image and transmitted input processing shown in FIG. 7, the operation performs selection regarding presence or absence of supplementary information at #2 shown in FIG. 6. At this time, under control of the supplementary-information input section 19, the screen 32 of the operation display panel 31 shifts to a state as shown in FIG. 9. In this state, upon the touch of a display portion "Transmit the read out image" by the user, the scanner 1 determines the specification as being "#2:No". In this case, the operation jumps to #7, in which the image data as having been acquired at #12 is transmitted as it is to every destination having been set at #11.

Figure 10A:
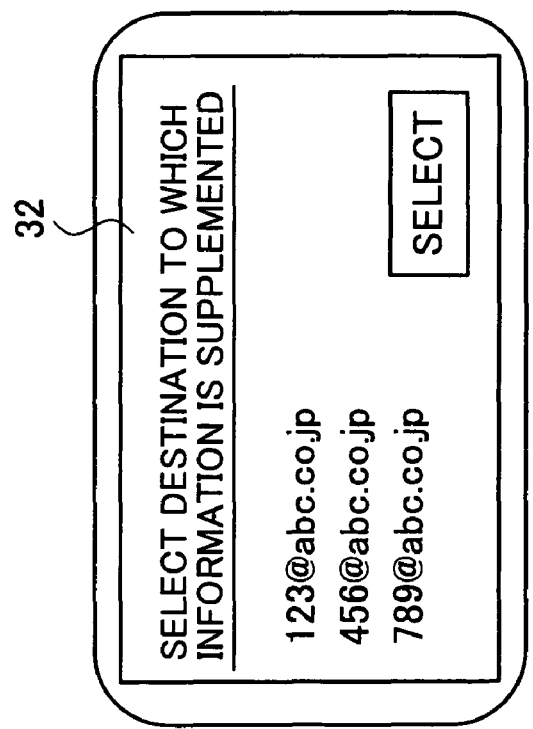
FIGS. 10a and 10b are plan views individually showing screens on the operation display panel for destination selection.
Figure 10B:
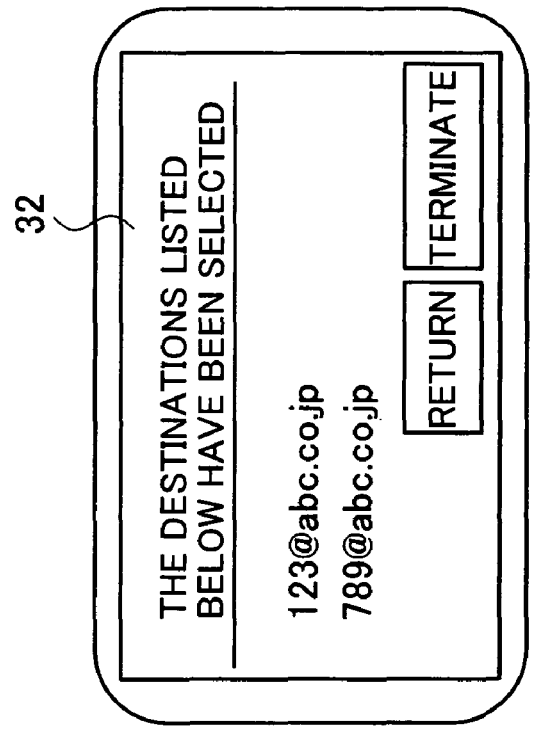

When the user touches a display portion "Add readout information to the image" on the screen 32 of FIG. 9, the scanner 1 determines the specification as being "#2:Yes". In response, the operation proceeds to #3, "Select destination". In this case, under the control of the supplementary-information input section 19, the screen 32 of the operation display panel 31 displays a screen as shown in FIG. 10a. In this state, the screen 32 lists all the destinations having been set at #11. The user then touches the portion of a destination to which the image data is intended to be transmitted with the added supplementary information whereby to reverse the contrast of the portion of the destination. Then, the user touches a display portion "select". In response, the screen 32 displays a screen as shown in FIG. 10b. In this state, the screen 32 only lists the destinations having been just selected on the previous screen. In this state, touching a display portion "Terminate" fixes the selection. Thereby, a destination(s) 'n' (n=natural number beginning from 1) is selected. The above completes the processing "Select destination" of #3.

Thus, either only a single destination or multiple destinations may be selected on the screen 32 shown in FIG. 10a. As such, all the destinations that are set in the destination setting section 23 are not always selected. However, all the listed destinations may be selected. When "select" is touched with no destination being selected, the selection is recognized that no supplementary information has been added. When the user touches a display portion "Return" on the screen 32 shown in FIG. 10b, the screen returns to the screen of FIG. 10a. This enables re-selection.

Upon termination of "Select destination" of #3, the operation proceeds to "Supplementary information input and correlation processing" of #4 for the selected destination(s) 'n'. The processing will be described hereinbelow by reference to the flow diagram of FIG. 11. In the supplementary information input and correlation processing, firstly, the operation performs selection regarding presence or absence of a page specification (#41). Specifically, the operation selects whether to add the supplementary information, which will be input, to the entirety of the image data or to a specified page in the image data. In this case, under the control of the page selector section 13, the screen 32 of the operation display panel 31 displays a screen as shown in FIG. 12.

In this state, when the user touches a display portion "Add to file", the scanner 1 determines the specification as being "#41:No". That is, the scanner 1 performs processing by recognizing the specification that the supplementary information is desired to be added to the entirety of the image data without a page specification being provided. The processing can be preferably used when supplementary information to be input is not specifically related to a specified page of the image data. In this case, the operation jumps to #45 described below, through a path (1) in the flow shown in FIG. 11. When the user touches a display portion "Add to a page" in the screen of FIG. 12 on the screen 32, the scanner 1 determines the specification as being "#41:Yes". Specifically, the scanner 1 processes the supplementary information by recognizing the specification that the supplementary information is desired to be added to a specific page specified in accordance with a page specification being provided. The processing can be preferably used when supplementary information to be input is specifically closely related to a specific page of the image data. In this case, the operation proceeds to #42.

Figure 13:
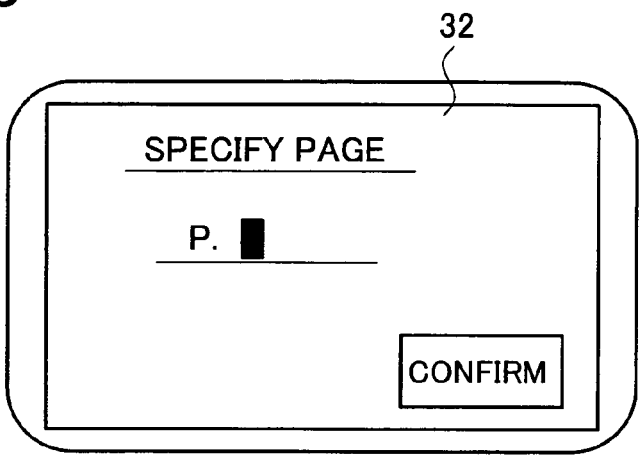
FIG. 13 is a plan view showing a screen on the operation display panel for page specification.

In the event of the page specification (#42), under the control of page selector section 13, the screen 32 of the operation display panel 31 displays a screen as shown in FIG. 13. In this state, when the user inputs a page number by using the input keys 34 and touches a display portion "Confirm", the page is specified. In this case, the user may preferably specify a page specifically closely related to the supplementary information which will be input. Thereby, the selected page data is created. Alternatively, the processing may be configured such that individual pages of images having been read out are displayed on the screen 32 (sequentially or at one time by being reduced in size) to be selected by the user.

Figure 14:
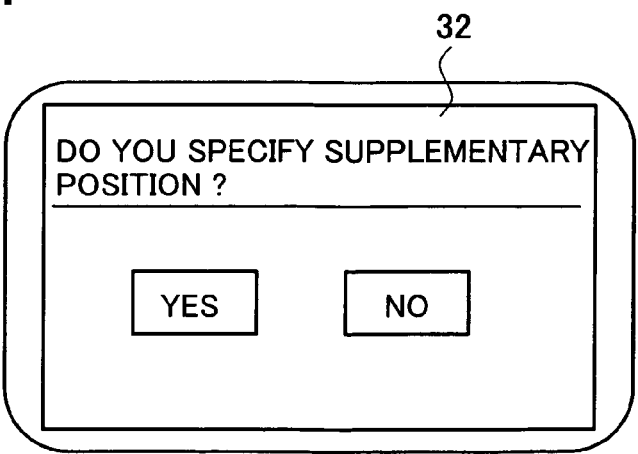
FIG. 14 is a plan view showing a screen on the operation display panel for selecting presence or absence of a position specification.

Subsequently, the operation performs selection regarding presence or absence of a position specification (#43). Specifically, the operation selects whether a specification is provided for a specific addition position of the supplementary information in the specified page or the supplementary information is added to the entirety of the page. In this case, under the control of the position specifying section 15, the screen 32 of the operation display panel 31 displays a screen as shown in FIG. 14. In this state, when the user touches a display portion "No", the scanner 1 determines the specification as being "#43:No". That is, the scanner 1 processes the supplementary information by recognizing the specification that the supplementary information is desired to be added to the entirety of the page without position specification being provided. The processing can be preferably used when a position specifically related to supplementary information being input is not present in the specified selected page. In this case, the operation proceeds to #45 described below, through a path (2) in the flow shown in FIG. 11. When the user touches a display portion "Yes" on the screen 32 shown in FIG. 14, the scanner 1 recognizes the specification as being "#43:Yes". Specifically, the scanner 1 processes the supplementary information by recognizing the specification that the supplementary information is desired to be added to a further specific page position in the specified page. The processing can be preferably used when supplementary information to be input is specifically closely related to a further specific page position in the specified selected page. In this case, the operation proceeds to #45 (described below) via "Position specification processing" of #44, through a path (3) in the flow shown in FIG. 11.

Figure 15:
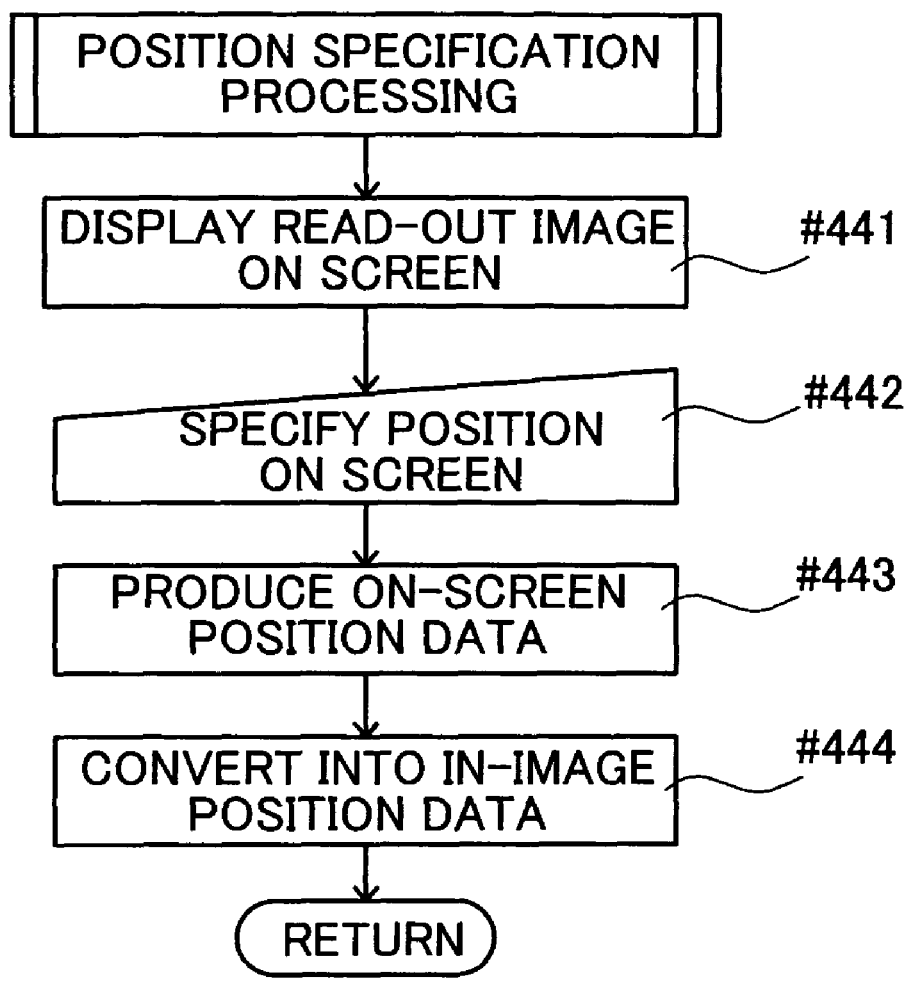
FIG. 15 is a flow diagram showing detail of position specification processing.
Figure 16:
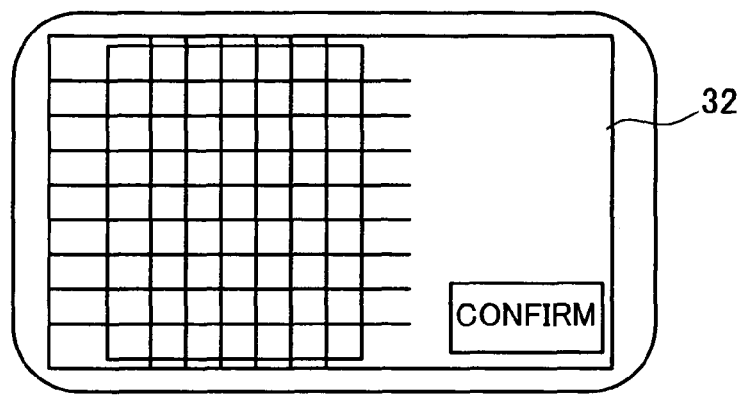
FIG. 16 is a plan view showing a screen on the operation display panel for position specification.

The position specification processing of #44 will now be described in detail herein by reference to the flow diagram of FIG. 15. Firstly, in the position specification processing, the screen 32 displays an image present in the page specified at #42 from images having been read out (#441). Specifically, the screen 32 displays a screen as shown in FIG. 16. Under the control of the position specifying section 15, the screen 32 displays a matrix-like mesh pattern superposed over the image present in the page. In this state, the user specifies an addition position of supplementary information (#442). Specifically, the user touches a desired position on the page being displayed whereby to cause a mark to be displayed thereat. Then, when a display portion "Confirm" is touched, the position specification is fixed. Thereby, on-screen position data indicative of the specified position is created by the position data processor section 16 (#443). The on-screen position data is then converted by the position data converter section 17 into in-image position data in accordance with the selected page data created at #42 (#444). Thus, on the screen 32, the user can easily specify the position intended to be specified. In this manner, the position specification processing of #44 is executed.

Figure 11:
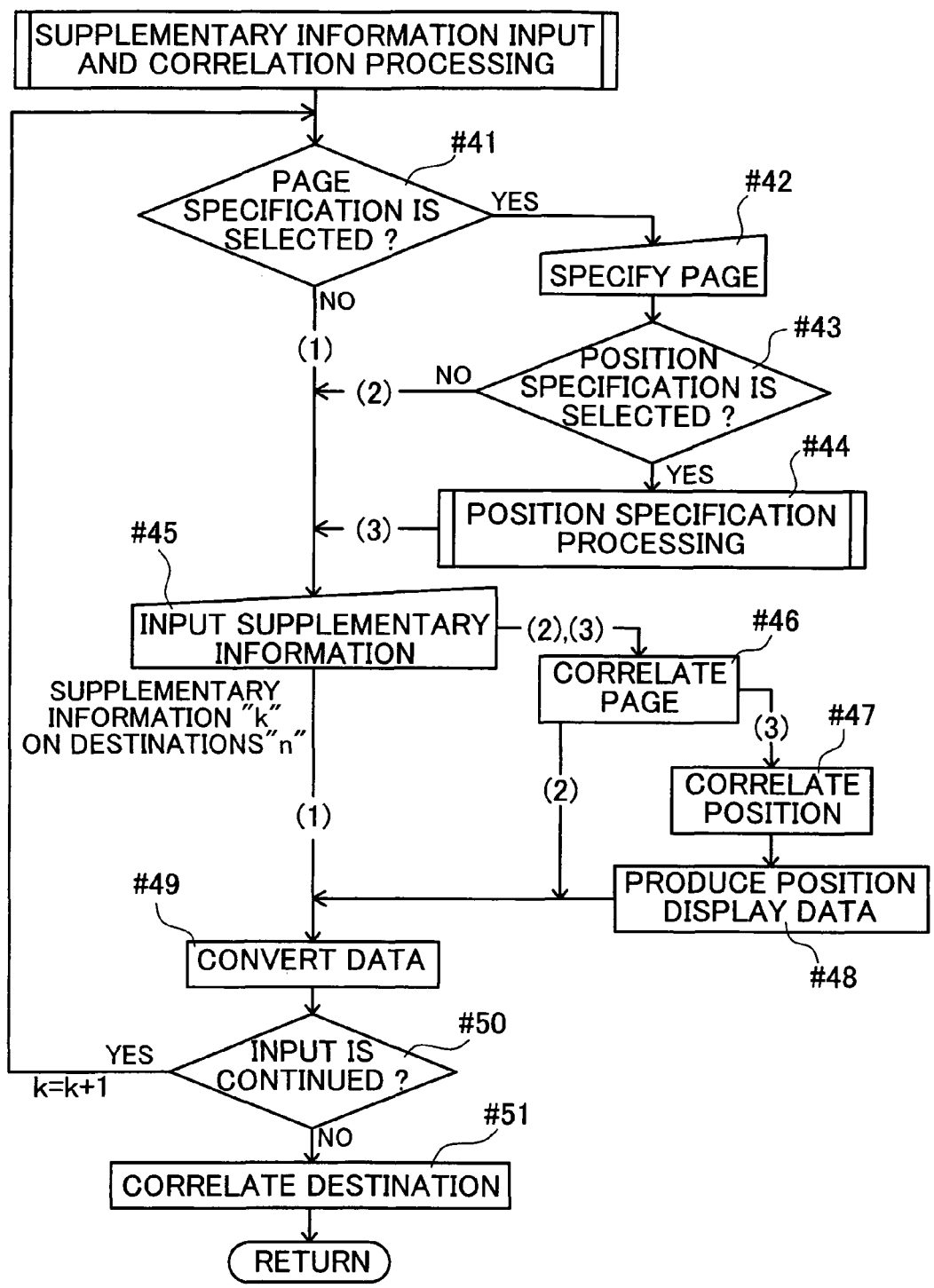
FIG. 11 is a flow diagram showing detail of supplementary-information input and correlating processing.
Figure 12:
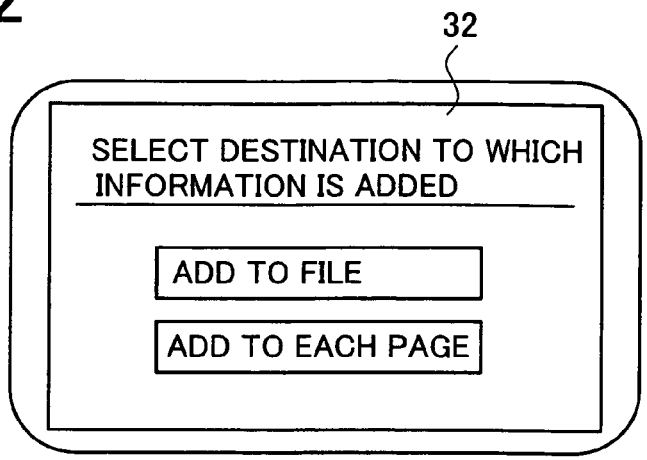
FIG. 12 is a plan view showing a screen on the operation display panel for selecting presence or absence of a page specification.
Figure 17:
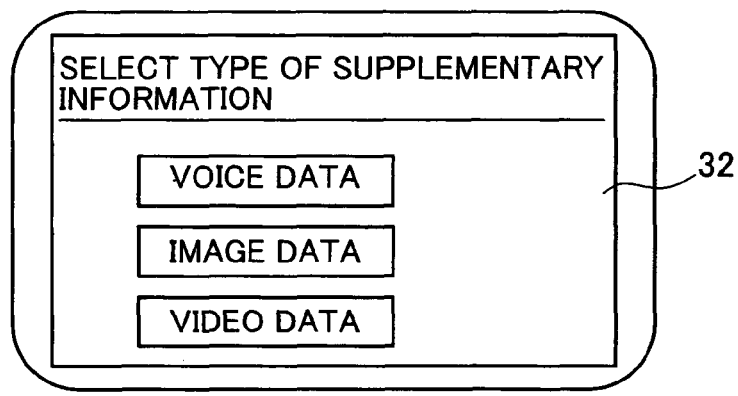
FIG. 17 is a plan view showing a screen on the operation display panel for selecting the type of supplementary information.

The following describes step #45, "Input supplementary information" shown in FIG. 11. In the supplementary-information input processing, the operation performs selection of the type of the supplementary information and selection of input means, and then executes the input processing. Firstly, the type of supplementary information is selected. At this time, under the control of the supplementary-information input section 19, the screen 32 displays a screen as shown in FIG. 17. In this state, when the user touches a display portion "Voice data", voice is selected for the type of supplementary information. Of course, if the user touches another display portion, the other type is selected.

Figure 18:
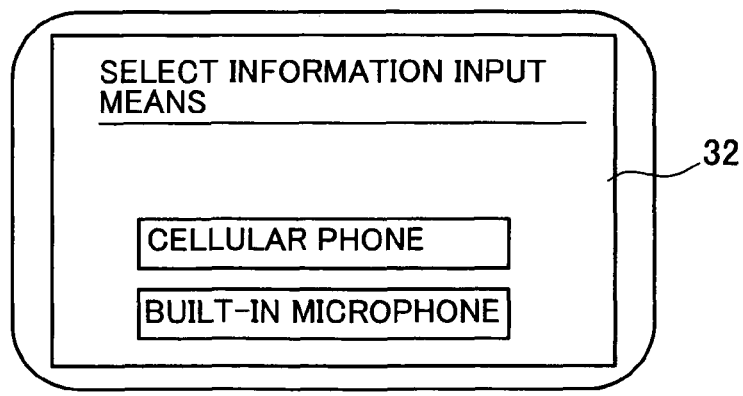
FIG. 18 is a plan view showing a screen on the operation display panel for selecting supplementary-information input means.

Upon selection of the voice data, the screen 32 displays a screen as shown in FIG. 18. In this state, the user selects the input means. Specifically, when the user touches a display portion "Cellular phone", a cellular phone is selected for the input means. Of course, if the user touches another display portion, the other type input means is selected. When other type supplementary information is selected on the screen of FIG. 17, corresponding input means selectable on the screen of FIG. 18 are displayed.

Figure 19:
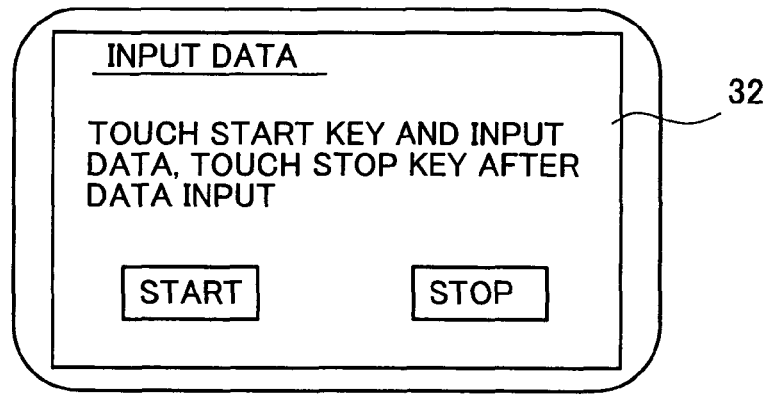
FIG. 19 is a plan view showing a screen on the operation display panel for supplementary-information input processing.

Upon selection of the input means, the screen 32 displays a screen as shown in FIG. 19. In this state, when the user touches a display portion "START", the system enters a state ready to accept a voice input by a cellular phone. In this state, the user inputs voice. Upon completion of the voice input, the user touches a display portion "STOP" of the screen of FIG. 19. Then, acceptance of the voice input is terminated, and supplementary information is created in accordance with the accepted voice. Thus, the processing of #45 is executed. The supplementary information created in this instance is supplementary information 'k' (k=natural number beginning from 1) for the destination(s) 'n'.

The step after the #45 shown in FIG. 11 is different depending upon the path having led the operation to the #45 from the #41. Specifically, when having jumped to #45 upon the determination "#41:No" (through the path (1)), the operation jumps to #49 from #45. When having proceeded to #45 through the steps from "#41:Yes" to "#43:No" (through the path (2)), the operation proceeds to #49 through #46 after #45. When having proceeded to #45 through the steps from "#41: Yes" to "#43:Yes" (through the path (3)), the operation proceeds to #49 through #46 to #48 after #45.

Accordingly, when "#41:Yes" (through the paths (2), (3)), page correlation is executed subsequent to #45 (#46). More specifically, the page correlator section 20 establishes the correlation between the supplementary information 'k' input at #45 and the selected page data created at #42. Thereafter, in the event of the path (2), the operation proceeds #49. In the event of the path (3), the position correlation is performed subsequent to #46 (#47). That is, the addition position correlator section 21 establishes the correlation between the supplementary information 'k' and the in-image position data acquired at #444. Thereby, addition-position correlated data is created. The addition-position correlated data specifies the position within a specific page to which the supplementary information 'k' is to be added. That is, the addition-position correlated data is used to add the supplementary information 'k' to the specific position within the image data. Then, the addition position display section 18 creates position display data (#48). When displaying the image data on a screen of the data receiver 3, 4, the position display data is used to display the image on which the mark indicative of the addition position of the supplementary information is superposed. The operation then proceeds to #49.

Figure 20:
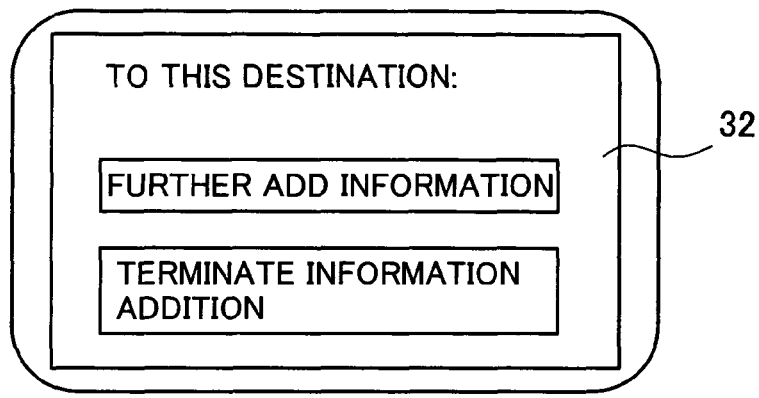
FIG. 20 is a plan view showing a screen on the operation display panel for selecting whether or not to continue supplementary-information input processing for the same destination.

At #49, data conversion is performed. Specifically, the supplementary information converter section 22 converts the supplementary information 'k' input at #45 into a format addable to the image data. Thereby, converted supplementary information is created. Upon termination of the data conversion, the operation selects whether or not to continue the input operation of the supplementary information for the same destination(s) 'n' (#50). The selection is performed because multiple items of supplementary information also can be added to a single item of image data. In this case, under the control of the supplementary-information input section 19, the screen 32 of the operation display panel 31 displays a screen as shown in FIG. 20. In this state, when the user touches a display portion "Further add information", the scanner 1 determines the specification as being "#50:Yes". In this event, after incrementing the value of 'k' by one while maintaining the value of 'n' unchanged, the operation returns to #41. Thereby, subsequent supplementary information is input for the same destination(s) 'n'.

When the user touches a display portion "Terminate information addition" on the screen 32 shown in FIG. 20, the scanner 1 determines the specification as being "#50:No". In this case, the input operation of the supplementary information for the destination(s) 'n' is recognized as having been completed. Then, the operation establishes correlations between the input supplementary information 1 to 'k' and the destination(s) 'n'. Specifically, the destination vs. supplementary information correlator section 24 creates destination versus supplementary information correlated data. This terminates the "Supplementary information input and correlation processing" shown in FIG. 11. In the flow shown in FIG. 11, the processings regarding the specification of the page, the position, and the like (#41 to #44) and the supplementary-information input processing (#45) may be interchanged in the sequence of execution.

Figure 21:
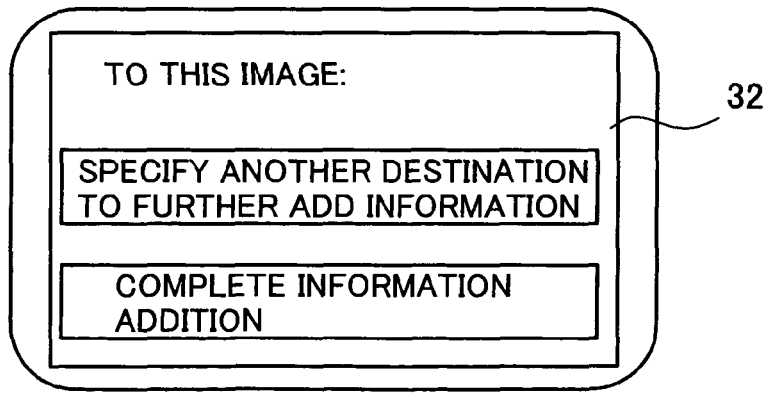
FIG. 21 is a plan view showing a screen on the operation display panel for selecting whether or not supplementary-information input processing has been terminated.

The operation then proceeds to #5 shown in FIG. 6. Specifically, the operation performs selection whether or not supplementary-information input processings for the image data have all been completed. The selection is performed because supplementary information different for each destination can be added to a single item of image data. In this event, under the control of the supplementary-information input section 19, the screen 32 of the operation display panel 31 displays a screen as shown in FIG. 21. In this state, when user touches a display portion "Specify another destination to further add information", the scanner 1 determines the specification as being "#5:No". In this case, the operation increments the value 'n' by one, and returns to #3. Thereby, (an) other destination(s) is or are selected (#3), and the processings, such as the supplementary-information input processing (#4), for the new selected destination(s) are performed.

When the user touches a display portion "Complete information addition" of the screen of FIG. 21 on the screen 32, the scanner 1 determines the specification as being "#5:Yes". In this case, data composition is performed (#6). Specifically, composite data is created by the data combiner section 25. The composite data is created individually for destination(s) 1 to 'n'. When at least one determination of "#5:No" has been made for image data, multiple types of composite data are created therefor. Then, data transmission is performed by the data transmitter section 26 (#7). For a destination selected at #3, the data to be transmitted in this step is composite data created for that destination. When a destination selected at #11 but not selected at #3 is present, the data to be transmitted to the destination is the image data as it is created at #13. The above completes the processing of the scanner 1.

Figure 22:
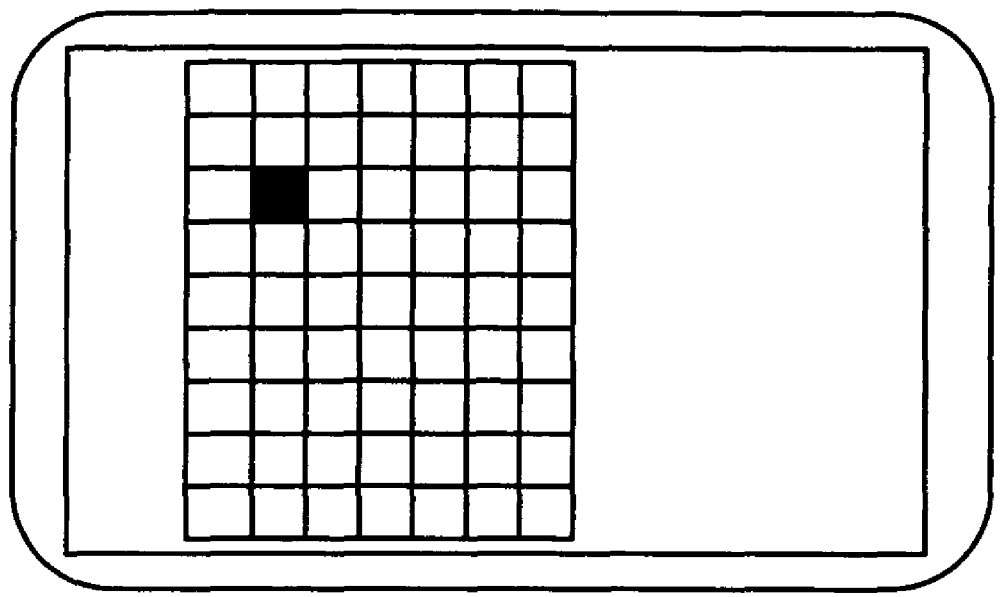
FIG. 22 is a plan view showing a screen at a receiving end where a mark indicative of information addition position is displayed in a superposed state.

The data transmitted from the scanner 1 is delivered via the server 2 to data receivers that has been set as the destination out of data receivers 3, 4, . . . . In the data receiver having accepted the data delivery, the data is received by the data receiver section 27. In the image data processor section 28, the image data contained in the received data is extracted, and processing thereof is performed. When the received data is composite data, the supplementary information is extracted and processed in the supplementary information processor section 29. Further, in the case that the supplementary information is correlated with an addition position, when image data processor section 28 performs the display of the image, the image is displayed with the mark (the black rectangle shown in FIG. 22, for example) being superposed at the addition position. Consequently, a user of the data receiver can easily recognize the position at which the information is added. The arrangement may be such that the received data is decomposed into the image data and the supplementary information, and then only necessary one of them is delivered to the image data processor section 28 and the supplementary information processor section 29.

As described above, according to the embodiment, the scanner 1 is implemented that, when transmitting image data to multiple destinations, enables addition of different supplementary information for each destination, and the image data communication system having the scanner 1 is implemented. This enables the supplementary information to be transmitted only to a specific one of the multiple destinations to which the image data is to be transmitted. Further, according to the scanner 1, not only supplementary information be added to the entirety of the image data, but also can be added by being correlated to a specific page of the image data. Thereby, when a page specifically related to supplementary information is present, the user at the receiving end can recognize the page.

Further, in the scanner 1, not only the supplementary information can be added to the entirety of the specified page, but also can be added by being correlated to the specific position in the page. Thereby, when there is a position closely correlated to the supplementary information, the user at the receiving end can recognize the position. Further, at that time, the scanner 1 adds position display data to the image data also. Thereby, when displaying the image on the screen at the receiving end, a mark is displayed by being superposed on the position at which the information is added. Consequently, the user at the receiving end can easily recognize the position. Further, in the scanner 1, when adding supplementary information to a specific position of a page, the page is displayed on the screen 32, and the addition position can be specified at the touch of the user. Consequently, this enables the user to easily specify the position.

The embodiment is shown and described only by way of an example and is in no way intended to limit the invention. Rather, various modifications and changes may of course be made in the invention, without departing from the spirit and scope of the invention. For example, the invention is adaptable not only to scanners, but also to others such as facsimile machines and complex apparatuses. In addition, the configuration may be such that data can be transmitted even through external lines. Further, the function of the server 2 may be included in the scanner 1. Processings similar to the embodiment can be implemented even in a case where not only image data read out from an image in a document, but also image data prestored in a memory is retrieved and transmitted. Further, similar processings can be implemented even in a case where photographed image data is acquired from, for example, a digital camera being connected, and is transmitted. Moreover, the processing may be configured such that the selection shown in FIG. 20 and the selection shown in FIG. 21 are combined to be executable on a single screen.

What is claimed is:

1. An image data transmitter comprising:
an image data acquiring section that acquires image data;
an image data transmitter section that transmits the image data to destinations;
a destination setting section that sets at least two destinations;
a destination selector section that selects at least one of the destinations which is set by the destination setting section;
a supplementary information acquiring section that acquires supplementary information which is to be added selectably to the entirety of the image data or to a specific location in the image data;
a destination versus supplementary information correlator section that establishes a correlation between the at least one destination selected by the destination selector section and the supplementary information acquired by the supplementary information acquiring section; and
a data combiner section that creates composite data for the at least one destination selected by the destination selector section, the composite data being created by adding the supplementary information correlated to the at least one destination by the destination versus supplementary information correlator section to the image data acquired by the image data acquiring section,
wherein the image data transmitter section transmits the composite data created by the data combiner section to the destination selected by the destination selector section.

2. The image data transmitter according to claim 1, wherein the image data transmitter section transmits the image data without added supplementary information to a destination not selected by the destination selector section.

3. The image data transmitter according to claim 1 wherein the supplementary information acquired by the supplementary information acquiring section is at least one of supplementary information selected from sets of voice information, image information, and character information.

4. The image data transmitter according to claim 1, further comprising: a page information storage section that stores page information of the image data acquired by the image data acquiring section; a page selector section that selects at least one of pages contained in page information stored in the page information storage section; and a page versus supplementary information correlator section that establishes a correlation between the page selected by the page selector section and the supplementary information acquired by the supplementary information acquiring section, wherein the data combiner section adds the supplementary information correlated with the page by the page versus supplementary information correlator section to the page in the image data.

5. The image data transmitter according to claim 4, further comprising: a position specifying section that specifies a specified position in the page selected by the page selector section; and a position versus supplementary information correlator section that establishes a correlation between the supplementary information correlated with the page by the page versus supplementary information correlator section and the specified position specified by the position specifying section, wherein the data combiner section adds the supplementary information correlated with the specified position by the position versus supplementary information correlator section to the specified position in the image data.

6. An image data transmitter comprising:
an image data acquiring section that acquires image data;
an image data transmitter section that transmits the image data to a destination;
a destination setting section that sets a destination;
a supplementary information acquiring section that acquires supplementary information which is to be added selectably to the entirety of the image data or to a specific location in the image data;
a page information storage section that stores page information of the image data acquired by the image data acquiring section;
a page selector section that selects at least one of the pages contained in the page information stored in the page information storage section;
a page versus supplementary information correlator section that establishes a correlation between the page selected by the page selector section and the supplementary information acquired by the supplementary information acquiring section; and
a data combiner section that creates composite data created by adding the supplementary information acquired by the supplementary information acquiring section to the image data acquired by the image data acquiring section, wherein the data combiner section adds the supplementary information correlated with the page by the page versus supplementary information correlator section to the page in the image data; and
the image data transmitter section transmits the composite data created by the data combiner section to the destination set by the destination setting section.

7. The image data transmitter according to claim 6, further comprising: a position specifying section that specifies a specified position in the page selected by the page selector section; and a position versus supplementary information correlator section that establishes a correlation between the supplementary information correlated with the page by the page versus supplementary information correlator section and the specified position specified by the position specifying section, wherein the data combiner section adds the supplementary information correlated with the specified position by the position versus supplementary information correlator section to the specified position in the image data.

8. The image data transmitter according to claim 7, further comprising a page display section that displays the image data acquired by the image data acquiring section in unit of page and that accepts a user specification of a position within a display range, wherein the position specifying section specifies a position specified on a display screen of the page display section to be the specified position.

9. The image data transmitter according to claim 7, wherein for supplementary information correlated by the position versus supplementary information correlator section with specified position, the data combiner section also adds position display data to image data, the position display data causing a mark indicative of the specified position to be displayed on a display screen of a device at a receiving end.

10. The image data transmitter according to claim 6, wherein the supplementary information acquired by the supplementary information acquiring section is at least one of supplementary information selected from sets of voice information, image information, and character information.

11. An image data communication system comprising an image data transmitter and image data receivers, wherein the image data transmitter comprises:
an image data acquiring section that acquires image data;
an image data transmitter section that transmits the image data to destinations;
a destination setting section that sets at least two destinations;
a destination selector section that selects at least one of the destinations which is set by the destination setting section;
a supplementary information acquiring section that acquires supplementary information which is to be added selectably to the entirety of the image data or to a specific location in the image data;
a destination versus supplementary information correlator section that establishes a correlation between the destination selected by the destination selector section and the supplementary information acquired by the supplementary information acquiring section; and
a data combiner section that creates composite data for the destination selected by the destination selector section, the composite data being created by adding the supplementary information correlated to the destination by the destination versus supplementary information correlator section to the image data acquired by the image data acquiring section,
wherein the image data transmitter section transmits the composite data created by the data combiner section to the destination selected by the destination selector section; and
the image data receivers comprise:
an image data processor section that processes received image data; and
a supplementary information processor section that processes supplementary information when the received data is composite data.

12. The image data communication system according to claim 11, wherein the image data transmitter section transmits the image data without added supplementary information to a destination not selected by the destination selector section.

13. The image data communication system according to claim 11, wherein the supplementary information acquired by the supplementary information acquiring section is at least one of supplementary information selected from sets of voice information, image information, and character information.

14. The image data communication system according to claim 11, wherein the image data transmitter further comprising: a page information storage section that stores page information of image data acquired by the image data acquiring section; a page selector section that selects at least one of pages contained in the page information stored in the page information storage section; and a page versus supplementary information correlator section that establishes a correlation between the page selected by the page selector section and the supplementary information acquired by the supplementary information acquiring section, wherein the data combiner section adds the supplementary information correlated with the page by the page versus supplementary information correlator section to the page in the image data.

15. The image data communication system according to claim 14, wherein the image data transmitter further comprising: a position specifying section that specifies a specified position in page selected by the page selector section; and a position versus supplementary information correlator section that establishes a correlation between the supplementary information correlated with the page by the page versus supplementary information correlator section and specified position specified by the position specifying section, wherein the data combiner section adds the supplementary information correlated with specified position by the position versus supplementary information correlator section to the specified position in the image data.

16. An image data communication system comprising an image data transmitter and an image data receiver, wherein the image data transmitter comprises:
- an image data acquiring section that acquires image data;
- an image data transmitter section that transmits the image data to a destination;
- a destination setting section that sets a destination;
- a supplementary information acquiring section that acquires supplementary information which is to be added selectably to the entirety of the image data or to a specific location in the image data;
- a page information storage section that stores page information of the image data acquired by the image data acquiring section;
- a page selector section that selects at least one of the pages contained in the page information stored in the page information storage section;
- a page versus supplementary information correlator section that establishes a correlation between the page selected by the page selector section and the supplementary information acquired by the supplementary information acquiring section; and
- a data combiner section that creates composite data created by adding the supplementary information acquired by the supplementary information acquiring section to the image data acquired by the image data acquiring section, wherein the data combiner section adds the supplementary information correlated with the page by the page versus supplementary information correlator section to the page in the image data; and the image data transmitter section transmits the composite data created by the data combiner section to the destination set by the destination setting section, and
the image data receiver comprises:
- an image data processor section that processes received image data; and
- a supplementary information processor section that processes supplementary information when the received data is composite data.

17. The image data communication system according to claim 16, wherein the image data transmitter further comprising: a position specifying section that specifies a specified position in page selected by the page selector section; and a position versus supplementary information correlator section that establishes a correlation between the supplementary information correlated with the page by the page versus supplementary information correlator section and the specified position specified by the position specifying section, wherein the data combiner section adds the supplementary information correlated with the specified position by the position versus supplementary information correlator section to the specified position in the image data.

18. The image data communication system according to claim 17, wherein the image data transmitter further comprises a page display section that displays the image data acquired by the image data acquiring section in unit of page and that accepts a user specification of a position within a display range, wherein the position specifying section specifies a position specified on a display screen of the page display section to be the specified position.

19. The image data communication system according to claim 17, wherein for supplementary information correlated by the position versus supplementary information correlator section with specified position, the data combiner section also adds position display data to the image data, the position display data causing a mark indicative of the specified position to be displayed on a display screen of a device at a receiving end.

20. The image data communication system according to claim 16, wherein the supplementary information acquired by the supplementary information acquiring section is at least one of supplementary information selected from sets of voice information, image information, and character information.

* * * * *